US010150856B2

(12) United States Patent
Cai et al.

(10) Patent No.: US 10,150,856 B2
(45) Date of Patent: Dec. 11, 2018

(54) CROSSLINKABLE POLYMERIC COMPOSITIONS WITH DIALLYL ISOCYANURATE CROSSLINKING COAGENTS, METHODS FOR MAKING THE SAME, AND ARTICLES MADE THEREFROM

(71) Applicant: Dow Global Technologies LLC, Midland, MI (US)

(72) Inventors: Yu Cai, Shanghai (CN); Hong Liang Zhang, Shanghai (CN); Yabin Sun, Shanghai (CN); Jeffrey M. Cogen, Flemington, NJ (US); Saurav S. Sengupta, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 13 days.

(21) Appl. No.: 15/116,546

(22) PCT Filed: Mar. 20, 2015

(86) PCT No.: PCT/CN2015/074711
§ 371 (c)(1),
(2) Date: Aug. 4, 2016

(87) PCT Pub. No.: WO2015/149632
PCT Pub. Date: Oct. 8, 2015

(65) Prior Publication Data
US 2017/0009061 A1 Jan. 12, 2017

(30) Foreign Application Priority Data
Mar. 31, 2014 (CN) ................ PCT/CN2014/074380

(51) Int. Cl.
| C08K 5/3492 | (2006.01) |
| C08K 5/14 | (2006.01) |
| C09D 123/06 | (2006.01) |
| H01B 3/44 | (2006.01) |
| C08J 3/24 | (2006.01) |
| C09D 123/04 | (2006.01) |

(52) U.S. Cl.
CPC .......... *C08K 5/34924* (2013.01); *C08J 3/243* (2013.01); *C08K 5/14* (2013.01); *C09D 123/04* (2013.01); *C09D 123/06* (2013.01); *H01B 3/441* (2013.01); *C08J 2323/14* (2013.01)

(58) Field of Classification Search
None
See application file for complete search history.

(56) References Cited

U.S. PATENT DOCUMENTS

| 4,176,027 | A | 11/1979 | Gotcher et al. |
| 4,339,507 | A * | 7/1982 | Kurtz ................ C08L 23/06 |
| | | | 156/244.11 |
| 4,480,094 | A | 10/1984 | Hagiwara et al. |
| 5,334,685 | A | 8/1994 | Ahmed et al. |
| 6,262,157 | B1 * | 7/2001 | Cogen ................ C08K 5/0025 |
| | | | 428/500 |
| 8,455,580 | B2 * | 6/2013 | Sengupta ............. C08L 23/06 |
| | | | 524/236 |
| 2009/0202769 | A1 | 8/2009 | Masuda et al. |
| 2009/0264050 | A1 | 10/2009 | Upadhyay et al. |
| 2013/0023629 | A1 | 1/2013 | Yamaura et al. |
| 2013/0041111 | A1 * | 2/2013 | Yamaura .............. C07D 251/34 |
| | | | 525/330.5 |
| 2013/0053520 | A1 * | 2/2013 | Yamaura .............. C08K 5/3492 |
| | | | 525/330.5 |
| 2013/0139985 | A1 | 6/2013 | Wright |
| 2015/0203701 | A1 | 7/2015 | Sun et al. |

FOREIGN PATENT DOCUMENTS

| CN | 101921425 A | 12/2010 |
| JP | 54103881 A | 8/1979 |
| JP | 05295043 A * | 11/1993 |
| JP | 2008-050467 A | 3/2008 |
| JP | 2011162634 A | 8/2011 |
| JP | 2011249758 A | 12/2011 |
| JP | 2012-041466 A | 3/2012 |
| JP | 5295043 B2 | 9/2013 |

OTHER PUBLICATIONS

Kameyama et al, JP 05-295043A, Machine Translation (Year: 1993).*
Bhowmick et al, Handbook of Elastomers, Second.*
Dow Global Technologies LLC, PCT/CN2015/074711 International Search Report and Written Opinion dated Jun. 5, 2015.
Dow Global Technologies LLC, PCT/CN2014/074380 International Search Report and Written Opinion dated Jan. 5 2015.

* cited by examiner

*Primary Examiner* — Callie E Shosho
*Assistant Examiner* — Patrick N English

(57) ABSTRACT

Crosslinkable polymeric compositions comprising an ethylene-based polymer, an organic peroxide, and a diallyl isocyanurate crosslinking coagent. Such crosslinkable polymeric compositions and their crosslinked forms can be employed as polymeric layers in wire and cable applications, such as insulation in power cables.

8 Claims, No Drawings

CROSSLINKABLE POLYMERIC COMPOSITIONS WITH DIALLYL ISOCYANURATE CROSSLINKING COAGENTS, METHODS FOR MAKING THE SAME, AND ARTICLES MADE THEREFROM

REFERENCE TO RELATED APPLICATIONS

The present application claims the benefit of International Application No. PCT/CN14/074380, filed on Mar. 31, 2014.

FIELD

Various embodiments of the present invention relate to crosslinkable polymeric compositions comprising diallyl isocyanurate crosslinking coagents, methods of making the same, and articles made therefrom.

INTRODUCTION

Medium, high, and extra-high voltage ("MV," "HV," and "EHV") cables typically contain a crosslinked polymeric material as an insulation layer, such as a crosslinked polyethylene. Such crosslinked polymeric materials can be prepared from a crosslinkable polymeric composition having a peroxide initiator. The radical reactions between peroxide and polyethylene generate undesirable byproducts which must be removed by vacuum after crosslinking the polyethylene. Although advances have been achieved in the field of crosslinkable polymeric compositions, improvements are still desired.

SUMMARY

One embodiment is a crosslinkable polymeric composition, comprising:
(a) an ethylene-based polymer;
(b) an organic peroxide; and
(c) a diallyl isocyanurate crosslinking coagent having a structure of either formula (I) or formula (II):

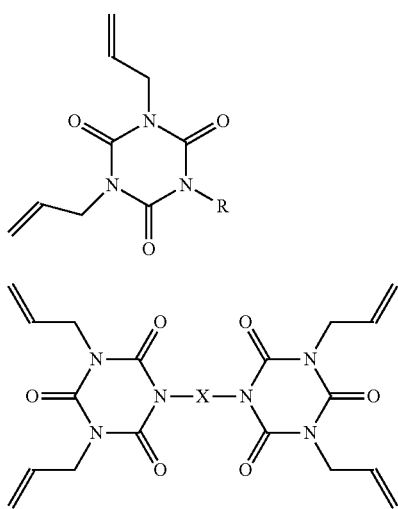

wherein R is an alkyl or alkenyl group having 14 or fewer carbon atoms, wherein X is a bivalent aliphatic chain or a bivalent hydrocarbyl group containing one or more aromatic groups.

DETAILED DESCRIPTION

Various embodiments of the present invention concern crosslinkable polymeric compositions comprising an ethylene-based polymer, an organic peroxide, and adiallyl isocyanurate crosslinking coagent. Additional embodiments concern crosslinked polymeric compositions prepared from such crosslinkable polymeric compositions. Further embodiments concern coated conductors and processes for producing coated conductors using the crosslinkable polymeric compositions.

Crosslinkable Polymeric Composition

As noted above, one component of the crosslinkable polymeric compositions described herein is an ethylene-based polymer. As used herein, "ethylene-based" polymers are polymers prepared from ethylene monomers as the primary (i.e., greater than 50 weight percent ("wt %")) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)).

In various embodiments, the ethylene-based polymer can be an ethylene homopolymer. As used herein, "homopolymer" denotes a polymer consisting of repeating units derived from a single monomer type, but does not exclude residual amounts of other components used in preparing the homopolymer, such as chain transfer agents.

In an embodiment, the ethylene-based polymer can be an ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. When an α-olefin is employed, the α-olefin can be a $C_{3-20}$ (i.e., having 3 to 20 carbon atoms) linear, branched or cyclic α-olefin. Examples of $C_{3-20}$ α-olefins include propene, 1-butene, 4-methyl-1-pentene, 1-hexene, 1-octene, 1-decease, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

In various embodiments, the ethylene-based polymer can be used alone or in combination with one or more other types of ethylene-based polymers (e.g., a blend of two or more ethylene-based polymers that differ from one another by monomer composition and content, catalytic method of preparation, etc.). If a blend of ethylene-based polymers is employed, the polymers can be blended by any in-reactor or post-reactor process.

In various embodiments, the ethylene-based polymer can be selected from the group consisting of low-density polyethylene ("LDPE"), linear-low-density polyethylene ("LLDPE"), very-low-density polyethylene ("VLDPE"), and combinations of two or more thereof.

In an embodiment, the ethylene-based polymer can be an LDPE. LDPEs are generally highly branched ethylene homopolymers, and can be prepared via high pressure processes (i.e., HP-LDPE). LDPEs suitable for use herein can have a density ranging from 0.91 to 0.94 g/cm³. In various embodiments, the ethylene-based polymer is a high-pressure LDPE having a density of at least 0.915 g/cm³, but less than 0.94 g/cm³, or less than 0.93 g/cm³. Polymer densities provided herein are determined according to ASTM International ("ASTM") method D792. LDPEs suitable for use herein can have a melt index ($I_2$) of less than 20 g/10 min., or ranging from 0.1 to 10 g/10 min., from 0.5 to 5 g/10 min., from 1 to 3 g/10 min., or an $I_2$ of 2 g/10 min. Melt indices provided herein are determined according to ASTM method D1238. Unless otherwise noted, melt indices are determined at 190° C. and 2.16 Kg (i.e., $I_2$). Generally, LDPEs have a broad molecular weight distribution ("MWD") resulting in a relatively high polydispersity index ("PDI;" ratio of weight-average molecular weight to number-average molecular weight).

In an embodiment, the ethylene-based polymer can be an LLDPE. LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a density ranging from 0.916 to 0.925 g/cm³. LLDPEs suitable for use herein can have a melt index ($I_2$) ranging from 1 to 20 g/10 min., or from 3 to 8 g/10 min.

In an embodiment, the ethylene-based polymer can be a VLDPE. VLDPEs may also be known in the art as ultra-low-density polyethylenes, or ULDPEs. VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein can have a density ranging from 0.87 to 0.915 g/cm³. VLDPEs suitable for use herein can have a melt index ($I_2$) ranging from 0.1 to 20 g/10 min., or from 0.3 to 5 g/10 min.

In addition to the foregoing, the ethylene-based polymer can contain one or more polar comonomers, such as acrylates or vinyl acetates. Additionally, blends of non-polar ethylene-based polymers, such as those described above, and polar copolymers (e.g., those copolymers containing one or more types of polar comonomers), may also be employed. Furthermore, polyolefin elastomers, such as those commercially available under the trade name ENGAGE™ from The Dow Chemical Company, may be used as the ethylene-based polymer or in combination with one or more of the above-described ethylene-based polymers.

In an embodiment, the ethylene-based polymer can comprise a combination of any two or more of the above-described ethylene-based polymers.

Production processes used for preparing ethylene-based polymers are wide, varied, and known in the art. Any conventional or hereafter discovered production process for producing ethylene-based polymers having the properties described above may be employed for preparing the ethylene-based polymers described herein. In general, polymerization can be accomplished at conditions known in the art for Ziegler-Natta or Kaminsky-Sinn type polymerization reactions, that is, at temperatures from 0 to 250° C., or 30 or 200° C., and pressures from atmospheric to 10,000 atmospheres (1,013 megaPascal ("MPa")). In most polymerization reactions, the molar ratio of catalyst to polymerizable compounds employed is from $10^{-12}$:1 to $10^{-1}$:1, or from $10^{-9}$:1 to $10^{-5}$:1.

An example of an ethylene-based polymer suitable for use herein is low-density polyethylene produced in a high pressure process and having a density of 0.92 g/cm³ and a melt index ($I_2$) of 2 g/10 min.

As noted above, the above-described ethylene-based polymer is combined with an organic peroxide. As used herein, "organic peroxide" denotes a peroxide having the structure: $R^1$—O—O—$R^2$, or $R^1$—O—O—R—O—O—$R^2$, where each of $R^1$ and $R^2$ is a hydrocarbyl moiety, and R is a hydrocarbylene moiety. As used herein, "hydrocarbyl" denotes a univalent group formed by removing a hydrogen atom from a hydrocarbon (e.g. ethyl, phenyl) optionally having one or more heteroatoms. As used herein, "hydrocarbylene" denotes a bivalent group formed by removing two hydrogen atoms from a hydrocarbon optionally having one or more heteroatoms. The organic peroxide can be any dialkyl, diaryl, dialkaryl, or diaralkyl peroxide, having the same or differing alkyl, aryl, alkaryl, or aralkyl moieties. In an embodiment, each of $R^1$ and $R^2$ is independently a $C_1$ to $C_{20}$ or $C_1$ to $C_{12}$ alkyl, aryl, alkaryl, or aralkyl moiety. In an embodiment, R can be a $C_1$ to $C_{20}$ or $C_1$ to $C_{12}$ alkylene, arylene, alkarylene, or aralkylene moiety. In various embodiments, R, $R^1$, and $R^2$ can have the same or a different number of carbon atoms and structure, or any two of R, $R^1$, and $R^2$ can have the same number of carbon atoms while the third has a different number of carbon atoms and structure.

Organic peroxides suitable for use herein include mono-functional peroxides and di-functional peroxides. As used herein, "mono-functional peroxides" denote peroxides having a single pair of covalently bonded oxygen atoms (e.g., having a structure R—O—O—R). As used herein, "di-functional peroxides" denote peroxides having two pairs of covalently bonded oxygen atoms (e.g., having a structure R—O—O—R—O—O—R). In an embodiment, the organic peroxide is a mono-functional peroxide.

Exemplary organic peroxides include dicumyl peroxide ("DCP"); tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)-3,3,5-trimethylcyclohexane; isopropylcumyl cumylperoxide; butyl 4,4-di(tert-butylperoxy) valerate; di(isopropylcumyl) peroxide; and mixtures of two or more thereof. In various embodiments, only a single type of organic peroxide is employed. In an embodiment, the organic peroxide is dicumyl peroxide.

As noted above, the crosslinkable polymeric composition further comprises a crosslinking coagent. The crosslinking coagent is a diallyl isocyanurate compound having a structure selected from formula (I) or formula (II):

(I)

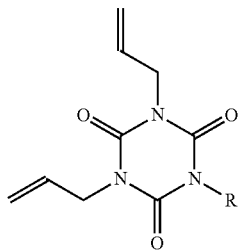

(II)

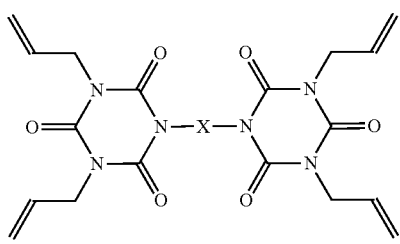

where R is an alkyl or alkenyl group having 14 or fewer carbon atoms, and where X is either a bivalent aliphatic chain or a bivalent hydrocarbyl group containing one or more aromatic groups. In various embodiments, X can have from 4 to 50 carbon atoms. As known in the art, an alkyl group is a monovalent, straight-chain, saturated aliphatic group, and an alkenyl group is a monovalent, straight-chain aliphatic group having a single carbon-carbon double bond. In various embodiments, R can be an alkyl or alkenyl group having fewer than 14 carbon atoms, or from 4 to 10 carbon atoms. Additionally, X can be an alkylene or alkenylene group having from 4 to 20 carbon atoms, or from 8 to 12 carbon atoms. As known in the art, an alkylene group is a bivalent, straight-chain, saturated aliphatic group, and an alkenylene group is a bivalent, straight-chain aliphatic group having a single carbon-carbon double bond. In other embodiments, X can be an aryl group (e.g., a phenyl group) that is bound to the two linked nitrogen atoms via respective alkylene groups (e.g., methylene groups), and can have from 4 to 20 carbon atoms, or from 6 to 10 carbon atoms.

In various embodiments, the diallyl isocyanurate can be selected from the group consisting of formulas (III) through (XI):

(III)

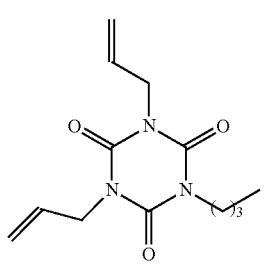

(IV)

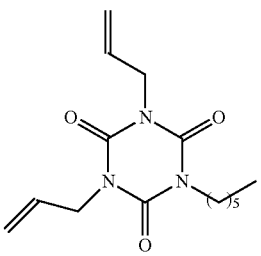

(V)

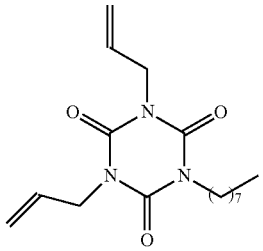

(VI)

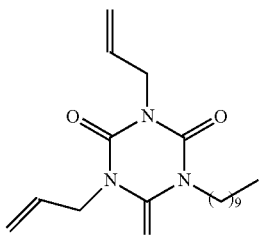

(VII)

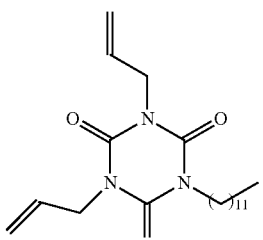

(VIII)

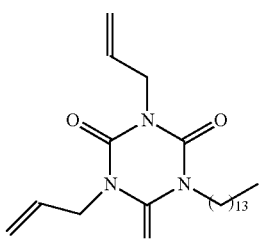

(IX)

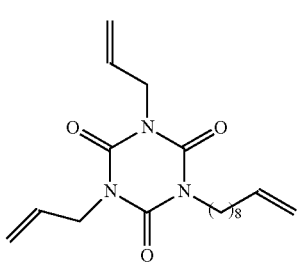

-continued

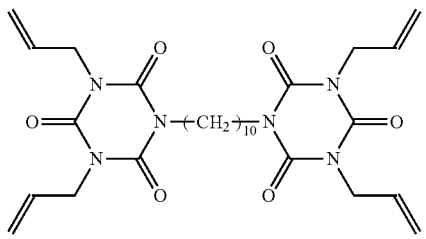

(X)

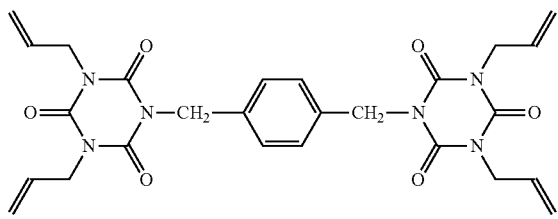

(XI)

In further embodiments, the diallyl isocyanurate can have a structure selected from the group consisting of formulas (III)-(VII), and (IX)-(XI). In still other embodiments, the diallyl isocyanurate can have a structure selected from the group consisting of formulas (III)-(VI).

In various embodiments, the crosslinkable polymeric composition can include one or more additional crosslinking coagents. Examples of such crosslinking coagents include polyallyl crosslinking coagents, such as triallyl isocyanurate ("TAIC"), triallyl cyanurate ("TAC"), triallyl trimellitate ("TATM"), triallyl orthoformate, pentaerythritol triallyl ether, triallyl citrate, and triallyl aconitate; ethoxylated bisphenol A dimethacrylate; α-methyl styrene dimer ("AMSD"); acrylate-based coagents, such as trimethylolpropane triacrylate ("TMPTA"), trimethylolpropane trimethylacrylate ("TMPTMA"), 1,6-hexanediol diacrylate, pentaerythritol tetraacrylate, dipentaerythritol pentaacrylate, tris (2-hydroxyethyl) isocyanurate triacrylate, and propoxylated glyceryl triacrylate; vinyl-based coagents, such as polybutadiene having a high 1,2-vinyl content, and trivinyl cyclohexane ("TVCH"); and other coagents as described in U.S. Pat. Nos. 5,346,961 and 4,018,852.

In various embodiments, the diallyl isocyanurate can constitute at least 1 wt %, at least 10 wt %, at least 50 wt %, at least 75 wt %, at least 90 wt %, or at least 99 wt % of the total amount of crosslinking coagent, based on the total weight of the crosslinking coagent present in the crosslinkable polymeric composition. In further embodiments, the diallyl isocyanurate can constitute all or substantially all of the crosslinking coagent, based on the total weight of the crosslinking coagent present in the crosslinkable polymeric composition. As used herein, "substantially all" with respect to the diallyl isocyanurate crosslinking coagent means all other crosslinking coagents are present in an aggregate amount of 10 parts per million by weight ("ppmw") or less.

In various embodiments, the crosslinkable polymeric composition can comprise the ethylene-based polymer in an amount ranging from 50 to 99 wt %, from 80 to 99 wt %, from 90 to 99 wt %, or from 95 to 99 wt %, based on the entire crosslinkable polymeric composition weight. Additionally, the crosslinkable polymeric composition can comprise the organic peroxide in an amount ranging from 0.1 to 5 wt %, from 0.1 to 3 wt %, from 0.4 to 2 wt %, from 0.4 to 1.7 wt %, from 0.5 to 1.4 wt %, or from 0.7 to less than 1.0 wt %, based on the entire crosslinkable polymeric composition weight. In various embodiments, the organic peroxide can be present in an amount of less than 1.0 wt %, or in the range of from 0.5 to 0.85 wt %, based on the entire crosslinkable polymeric composition weight. In still further embodiments, the organic peroxide can be present in an amount of less than 1.0 parts per hundred resin ("phr"), less than 0.85 phr, or in the range of from 0.5 to 0.85 phr, based on 100 weight parts of the ethylene-based polymer. Furthermore, the crosslinkable polymeric composition can comprise the diallyl isocyanurate crosslinking coagent in an amount ranging from 0.1 to 3 wt %, from 0.5 to 3 wt %, from 0.7 to 3 wt %, or from 0.85 to 3 wt %, based on the entire crosslinkable polymeric composition weight. In further embodiments, the organic peroxide and diallyl isocyanurate crosslinking coagent can be present in a coagent-to-peroxide weight ratio of at least 1:1, or greater than 1:1.

In various embodiments, the crosslinking coagent and organic peroxide can be present in amounts sufficient to achieve a molar ratio of allyl groups to active oxygen atoms of at least 1.6, at least 1.9, at least 2.5, or at least 3.0, and up to 5, up to 7.5, up to 10, up to 12, or up to 16 allyl groups/active oxygen atoms. In determining this ratio, only oxygen atoms present as one of two covalently bonded oxygen atoms in the organic peroxide are considered "active oxygen atoms." For example, a mono-functional peroxide has two active oxygen atoms. Oxygen atoms present in the organic peroxide or the polyallyl crosslinking coagent that are not covalently bonded to another oxygen atom are not considered active oxygen atoms. Additionally, only pendant allyl groups found on the polyallyl cross-linking coagent are included in the molar ratio of allyl groups/active oxygen atoms. The allyl-to-active oxygen molar ratio is calculated as follows:

$$\frac{(\text{moles polyallyl coagent})(\text{number of allyl groups per coagent molecule})}{(\text{moles peroxide})(\text{number of active oxygen atoms per peroxide molecule})}$$

In addition to the components described above, the crosslinkable polymeric composition may also contain one or more additives including, but not limited to, antioxidants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators. Additives, other than fillers, are typically used in amounts ranging from 0.01 or less to 10 or more wt % based on total composition weight. Fillers are generally added in larger amounts, although the amount can range from as low as 0.01 or less to 65 or more wt % based on the total composition weight. Illustrative examples of fillers include clays, precipitated silica and silicates, fumed silica, calcium carbonate, ground minerals, aluminum trihydroxide, magnesium hydroxide, and carbon blacks with typical arithmetic mean particle sizes larger than 15 nanometers.

In various embodiments, the crosslinkable polymeric composition can comprise one or more antioxidants. Exemplary antioxidants include hindered phenols (e.g., tetrakis [methylene (3,5-di-t-butyl-4-hydroxyhydrocinnamate)] methane), less-hindered phenols, and semi-hindered phenols; phosphates, phosphites, and phosphorites (e.g., tris (2,4-di-t-butylphenyl) phosphate); thio compounds (e.g., distearyl thiodipropionate, dilaurylthiodipropionate); various siloxanes; and various amines (e.g., polymerized 2,2,4-trimethyl-1,2-dihydroquinoline). In various embodiments, the antioxidant is selected from the group consisting of distearyl thiodipropionate, dilauryl thiodipropionate, octadecyl-3,5-di-t-butyl-4-hydroxyhydrocinnamate, benzenepropanoic acid, 3,5-bis(1,1-dimethylethyl)-4-hydroxy-thiodi-2,1-ehtanediyl ester, stearyl 3-(3,5-di-t-butyl-4-hydroxyphenyl) propionate, octadecyl-3-(3,5-di-tert-butyl-4-hydroxyphenyl)-propionate, 2,4-bis(dodecylthiomethyl)-6-methylphenol, 4,4'-thiobis(6-tert-butyl-m-cresol), 4,6-bis(octylthiomethyl)-o-cresol, 1,3,5-tris(4-tert-butyl-3-hydroxy-2,6-dimethyl benzyl)-1,3,5-triazine-2,4,6-(1H,3H,5H)-trione, pentaerythritol tetrakis(3-(3,5-di-t-butyl-4-hydroxyphenyl)propionate), 2',3-bis[[3-[3,5-di-tert-butyl-4-hydroxyphenyl]propionyl]] propionohydrazide, and mixtures of two or more thereof. Antioxidants, when present, can be used in amounts ranging from 0.01 to 5 wt %, from 0.01 to 1 wt %, from 0.1 to 5 wt %, from 0.1 to 1 wt %, or from 0.1 to 0.5 wt %, based on the total weight of the crosslinkable polymeric composition.

Preparation of Crosslinkable Polymeric Composition

Preparation of the cross-linkable polymeric composition can comprise compounding the above-described components. For example, compounding can be performed by either (1) compounding all components into the ethylene-based polymer, or (2) compounding all the components except for the organic peroxide and crosslinking coagent, which can be soaked in as described below. Compounding of the cross-linkable polymeric composition can be effected by standard equipment known to those skilled in the art. Examples of compounding equipment are internal batch mixers, such as a Brabender™, Banbury™, or Bolling™ mixer. Alternatively, continuous single or twin screw, mixers can be used, such as a Farrel™ continuous mixer, a Werner and Pfleiderer™ twin screw mixer, or a Buss™ kneading continuous extruder. Compounding can be performed at a temperature of greater than the melting temperature of the ethylene-based polymer up to a temperature above which the ethylene-based polymer begins to degrade. In various embodiments, compounding can be performed at a temperature ranging from 100 to 200° C., or from 110 to 150° C.

In one or more embodiments, the ethylene-based polymer and any optional components can first be melt compounded according to the above-described procedure and pelletized. Next, the organic peroxide and the crosslinking coagent can be soaked into the resulting ethylene-based polymer compound, either simultaneously or sequentially. In an embodiment, the organic peroxide and coagent can be premixed at the temperature above the melting temperature of the organic peroxide and coagent, whichever is greater, followed by soaking the ethylene-based polymer compound in the resulting mixture of the organic peroxide and crosslinking coagent at a temperature ranging from 30 to 100° C., from 50 to 90° C., or from 60 to 80° C., for a period of time ranging from 1 to 168 hours, from 1 to 24 hours, or from 3 to 12 hours.

The resulting crosslinkable polymeric composition can have certain enhanced properties. Though not wishing to be bound by theory, it is believed that selecting a diallyl isocyanurate having a substituent group on the $5^{th}$ position of the 1,3,5-triazine ring with 14 or fewer carbon atoms can surprisingly provide superior resistance to coagent migration out of the crosslinkable polymeric composition. Thus, in various embodiments, the crosslinkable polymeric composition can exhibit a crosslinking coagent migration to the surface of the crosslinkable polymeric composition of less than 1,000 parts per million ("ppm"), less than 750 ppm, less than 500 ppm, or less than 200 ppm, when stored at 23° C. and 1 atm over a period of four weeks. Furthermore, the crosslinkable polymeric composition can exhibit a crosslinking coagent migration to the surface of the crosslinkable polymeric composition in the range of from 1 to 1,000 ppm, from 10 to 750 ppm, from 50 to 500 ppm, or from 100 to 200 ppm, based on the entire weight of the crosslinkable polymeric composition, when stored at 23° C. and 1 atm over a period of four weeks. The method for determining coagent migration is detailed in the Test Methods section, below, at a coagent loading of 1.38 wt % or less based on the entire weight of the crosslinkable polymeric composition.

In addition, the crosslinkable polymeric composition can exhibit superior scorch resistance, as indicated by Scorch Improvement ("SI"), the method for determining which is detailed in the Test Methods section, below. In one or more embodiments, the crosslinkable polymeric composition can have an SI of at least 15 minutes, at least 20 minutes, at least 25 minutes, or at least 30 minutes. Furthermore, the crosslinkable polymeric composition can have an SI in the range of from 15 to 50 minutes, from 20 to 45 minutes, or from 30 to 40 minutes. Scorch improvement is determined by comparing the crosslinkable polymeric composition to an identical comparative crosslinkable polymeric composition, except that the comparative composition contains no crosslinking coagent, which has been replaced with an equivalent amount of additional ethylene-based polymer.

Crosslinked Polymeric Composition

The above-described crosslinkable polymeric composition can be cured or allowed to cure in order to form a crosslinked polymeric composition. Such curing can be performed by subjecting the crosslinkable polymeric composition to elevated temperatures in a heated cure zone, which can be maintained at a temperature in the range of 175 to 260° C. The heated cure zone can be heated by pressurized steam or inductively heated by pressurized nitrogen gas. Thereafter, the crosslinked polymeric composition can be cooled (e.g., to ambient temperature).

The crosslinking process can create volatile decomposition byproducts in the crosslinked polymeric composition. Following crosslinking, the crosslinked polymeric composition can undergo degassing to remove at least a portion of the volatile decomposition byproducts. Degassing can be performed at a degassing temperature, a degassing pressure, and for a degassing time period to produce a degassed polymeric composition. In various embodiments, the degassing temperature can range from 50 to 150° C., or from 60 to 80° C. In an embodiment, the degassing temperature is 65 to 75° C. Degassing can be conducted under standard atmosphere pressure (i.e., 101,325 Pa).

Coated Conductor

A cable comprising a conductor and an insulation layer can be prepared employing the above-described crosslinkable polymeric composition. "Cable" and "power cable" mean at least one wire or optical fiber within a sheath, e.g., an insulation covering and/or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. Typical cable designs are illustrated in U.S. Pat. Nos. 5,246,783, 6,496,629 and 6,714,707. "Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

Such a cable can be prepared with various types of extruders (e.g., single or twin screw types) by extruding the crosslinkable polymeric composition onto the conductor, either directly or onto an interceding layer. A description of a conventional extruder can be found in U.S. Pat. No. 4,857,600. An example of co-extrusion and an extruder therefore can be found in U.S. Pat. No. 5,575,965.

Following extrusion, the extruded cable can pass into a heated cure zone downstream of the extrusion die to aid in crosslinking the crosslinkable polymeric composition and thereby produce a crosslinked polymeric composition. The heated cure zone can be maintained at a temperature in the range of 175 to 260° C. In an embodiment, the heated cure zone is a continuous vulcanization ("CV") tube. In various embodiments, the crosslinked polymeric composition can then be cooled and degassed, as discussed above.

Alternating current cables can be prepared according to the present disclosure, which can be low voltage, medium voltage, high voltage, or extra-high voltage cables. Further, direct current cables can be prepared according to the present disclosure, which can include high or extra-high voltage cables.

Test Methods

Density
Determine density according to ASTM D792.
Melt Index
Measure melt index, or $I_2$, in accordance with ASTM D1238, condition 190° C./2.16 kg, and report in grams eluted per 10 minutes.
Moving Die Rheometer ("MDR")
Curing behavior is recorded by MDR at 180° C. according to ASTM D5289. Similar tests are conducted at a temperature of 140° C. in order to characterize a scorch time (the time required for the sample to achieve a unit increase in torque).
Nuclear Magnetic Resonance ("NMR")
NMR data were collected from a Bruker Ultrashield 400 plus NMR spectrometer. The peaks of deuterated solvents were used as reference, with chemical shift of $CDCl_3$ set to be 7.27 ppm and chemical shift of $DMSO-d_6$ set to be 2.50 ppm, respectively.
Liquid Chromatography/Mass Spectrometry
LC-MS data were recorded on Agilent 1220 HPLC/G6224A TOF mass spectrometer.
Coagent Migration
Pelletized PE samples are stored at ambient conditions for the desired period of time before determining coagent migration. After aging is complete, weigh 3.000±0.001 g pellet sample and place into a 40-mL vial. Add 14.5 mL of acetonitrile into the vial, seal the vial, and shake in a shaker for 5 minutes. Collect the liquid in the 40-mL vial and place into a 2-mL sample vial for high-pressure liquid chromatography ("HPLC") analysis. Analyze the samples by HPLC according to the following conditions:

| LC Parameter | Details |
|---|---|
| Column | Agilent Extend-C18, 5 μm particle, 4.6 mm × 150 mm |
| Column Oven | 40° C. |
| Flow rate | 1.0 mL/min. |
| Injection volume | 10 μL |
| Detector | UV absorbance at 210 nm |
| Mobile Phase A | Water |
| Mobile Phase B | Acetonitrile |

| Time (min.) | B % | Flow Rate (mL/min.) |
|---|---|---|
| 0.00 | 60 | 1.0 |
| 8.00 | 80 | 1.0 |
| 10.00 | 95 | 1.0 |
| 12.00 | 100 | 1.0 |
| 25.00 | 100 | 1.0 |
| 25.10 | 60 | 1.0 |

The co-agent content in acetonitrile ("ACN") solution is calculated from pre-established calibration curve. A calibration curve is established by plotting UV absorbance response from the HPLC detector against acetonitrile solutions of a certain co-agent at several different concentrations. Then the concentration of a sample co-agent solution can be determined from this pre-established curve. With the known content of co-agent in a sample solution, the migration level from the sample can be back-calculated. The numerical value is given in ppm of total weight of a XLPE compound.

Scorch Improvement

Scorch Improvement ("SI") is calculated following the equation (1) below:

$$SI = ts1@140°\ C. - ts1'@140°\ C. \qquad (1)$$

where:
ts1@140° C. is the scorch time that a formulation containing both a crosslinking coagent and DCP achieves at 140° C.; and
ts1'@140° C. is the scorch time that a formulation containing only DCP can achieve, which is predicted by the equation (2) below:

$$ts1'@140°\ C. = -7.97 + 167.91/(MH-ML)@180°\ C. \qquad (2)$$

where:
MH−ML@180° C. is the crosslink density of the sample with only DCP measured by MDR at 180° C.

The equation (2) is the relationship between crosslink density (MH−ML@180° C.) and scorch time (ts1'@140° C.) of the sample with DCP only. Therefore, the scorch time of the sample with DCP only (ts1'@140° C.) at a given crosslink density (MH−ML@180° C.) can be predicted by this equation. The SI value suggests how the addition of a crosslinking coagent will impact the scorch time compared to the sample without coagent. A negative value means the coagent reduces the anti-scorch property, while a positive value means the coagent improves the anti-scorch property, with the greater the positive value the better.

Materials

The following materials are employed in the Examples, below.

A first low-density polyethylene ("LDPE") is employed that has a melt index ($I_2$) of 2 g/10 min. and a density of 0.92 g/cm$^3$. This LDPE ("LDPE 1") is produced by The Dow Chemical Company, Midland, Mich.

A second LDPE ("LDPE 2") employed has a melt index ($I_2$) of 2 g/10 min. and a density of 0.92 g/cm$^3$. This second LDPE is produced by The Dow Chemical Company, Midland Mich., USA. LDPE 2 contains 0.14 wt % Cyanox 1790 (from Cytec Industries), 0.22 wt % distearyl thiodipropionate ("DSTDP") (from Reagens) and 0.008 wt % Cyasorb UV 3346 (from Cytec Industries).

Dicumyl peroxide is commercially available from Shanghai Fangruida Chemicals Co., Ltd.

Stabilizer Preblend is a melt blend of 37:61:2 wt % mixture of Cyanox 1790 (from Cytec Industries), distearyl thiodipropionate ("DSTDP") (from Reagens) and Cyasorb UV 3346 (from Cytec Industries).

Triallyl isocyanurate is commercially available from Shanghai Fangruida Chemicals Co., Ltd.

N,N-Dimethylformamide is commercially available from Sigma-Aldrich Corporation.

Unmodified diallyl isocyanurate is commercially available from Tokyo Chemical Industry Co., Ltd.

Potassium carbonate is commercially available from Sigma-Aldrich Corporation.

1-bromobutane is commercially available from Sigma-Aldrich Corporation.

1-bromooctane is commercially available from Sigma-Aldrich Corporation.

1-bromodecane is commercially available from Sigma-Aldrich Corporation.

1-bromotetradecane is commercially available from Sigma-Aldrich Corporation.

1-bromohexadecane is commercially available from Sigma-Aldrich Corporation.

1-bromooctadecane is commercially available from Sigma-Aldrich Corporation.

10-bromo-1-decene is commercially available from Sigma-Aldrich Corporation.

1,4-bis(chloromethyl)benzene is commercially available from Sigma-Aldrich Corporation.

EXAMPLES

Coagent Preparation Procedure

A 1,3-diallyl-5-octyl isocyanurate coagent is prepared by first dissolving 3 g (0.0143 mol) of unmodified diallyl isocyanurate in 20 mL of N,N'-dimethylformamide ("DMF"). Next, add 1.98 g (0.0143 mol) of potassium carbonate into the solution, then heat the solution by a temperature-controlled oil bath to 50° C. Thereafter, 2.76 g (0.0143 mol) of 1-bromooctane is added over ten minutes followed by heating the suspension to 120° C. Then, the mixture is magnetically stirred for 4 hours at 120° C. before cooling to room temperature. The reaction mixture is then filtered through fast-rate filter paper, and the solution is rotary-evaporated (85° C., 100 mTorr) to remove DMF. The residue is re-dissolved in ethyl acetate (25 mL) and extracted sequentially by water (10 mL), 5% hydrochloric acid (10 mL), and saturated sodium chloride solution (10 mL). The resulting organic solution is dried over magnesium sulfate, filtered through fast-rate filter paper, and rotary-evaporated (85° C., 100 mbar) to yield a colorless oil (3.78 g). $^1$H NMR (400 MHz, CDCl$_3$) δ 5.84 (m, 2H), 5.14 (m, 4H), 4.34 (m, 4H), 3.74 (t, 2H), 1.54 (t, 2H), 1.25 (m, 10H), 0.86 (t, 3H). ESI-MS (m/z, MH$^+$) Calculated: 322.42 Da; Found: 322.21 Da.

As noted above, the foregoing procedure describes the preparation of 1,3-diallyl-5-octyl isocyanurate. Other diallyl isocyanurate coagents are prepared by employing 1-bromobutane (for 1,3-diallyl-5-butyl isocyanurate), 1-bromodecane (for 1,3-diallyl-5-decyl isocyanurate), 1-bromotetradecane (for 1,3-diallyl-5-tetradecyl isocyanurate), 1-bromohexadecane (for 1,3-diallyl-5-hexadecyl isocyanurate), 1-bromooctadecane (for 1,3-diallyl-5-octadecyl isocyanurate), 1-bromodocosane (for 1,3-diallyl-5-docosyl isocyanurate), or 10-bromo-1-decease (for 1,3-diallyl-5-decenyl isocyanurate) in place of the 1-bromooctane. The amount of alkyl bromide is varied in each instance to maintain a 1:1:1 molar ratio of unmodified diallyl isocyanurate:potassium carbonate:alkyl bromide.

Characterization of Above Co-Agents:

1,3-Diallyl-5-butyl isocyanurate: $^1$H NMR (400 MHz, CDCl$_3$) δ 5.87 (m, 2H), 5.28 (m, 4H), 4.50 (d, 4H), 3.89 (t, 2H), 1.62 (m, 2H), 1.37 (m, 2H), 0.95 (t, 3H). ESI-MS (m/z, MH$^+$) Calculated: 266.32 Da; Found: 266.39 Da.

1,3-Diallyl-5-tetradecyl isocyanurate: $^1$H NMR (400 MHz, DMSO-d$_6$) δ 5.81 (m, 2H), 5.13 (m, 4H), 4.34 (d, 2H), 3.73 (t, 2H), 1.53 (m, 2H), 1.23 (m, 22H), 0.85 (t, 3H). ESI-MS (m/z, MH$^+$) Calculated: 406.58 Da; Found: 406.31 Da.

1,3-Diallyl-5-hexadecyl isocyanurate: $^1$H NMR (400 MHz, CDCl$_3$) δ 5.89 (m, 2H), 5.30 (m, 4H), 4.51 (d, 2H), 3.89 (t, 2H), 1.65 (t, 2H), 1.27 (m, 26H), 0.90 (t, 3H). ESI-MS (m/z, MH$^+$) Calculated: 434.63 Da; Found: 434.26 Da.

1,3-Diallyl-5-octadecyl isocyanurate: $^1$H NMR (400 MHz, DMSO-d$_6$) δ 5.89 (m, 2H), 5.30 (m, 4H), 4.50 (d, 4H), 3.89 (d, 2H), 1.65 (m, 2H), 1.27 (m, 30H), 0.90 (t, 3H). ESI-MS (m/z, MH$^+$) Calculated: 462.69 Da; Found: 462.37 Da.

1,3-Diallyl-5-docosyl isocyanurate: $^1$H NMR (400 MHz, DMSO-d$_6$) δ 5.89 (m, 2H), 5.29 (m, 4H), 4.49 (d, 4H), 3.88 (t, 2H), 1.64 (m, 2H), 1.26 (m, 38H), 0.89 (t, 3H). ESI-MS (m/z, MH$^+$) Calculated: 518.80 Da; Found: 518.43 Da.

1,3-Diallyl-5-decenyl isocyanurate: $^1$H NMR (400 MHz, CDCl$_3$) δ 5.78 (m, 3H), 5.21 (m, 4H), 4.89 (m, 2H), 4.42 (d, 4H), 3.80 (t, 2H), 1.97 (m, 2H), 1.54 (m, 2H), 1.24 (m, 10H). ESI-MS (m/z, MH$^+$) Calculated: 348.46 Da; Found: 348.13 Da.

The 5,5'-(decane-1,10-diyl)bis(1,3-diallyl-1,3,5-triazinane-2,4,6-trione)("di-DAIC-decyl") is prepared by first dissolving 3 g (0.0143 mol) of unmodified diallyl isocyanurate in 20 mL of N,N-dimethylformamide ("DMF"). Next, add 1.98 g (0.0143 mol) of potassium carbonate into the solution, then heat the solution by a temperature-controlled oil bath to 50° C. Thereafter, 2.15 g (0.0072 mol) of 1,10-dibromodecane is added over ten minutes followed by heating the suspension to 120° C. Then, the mixture is magnetically stirred for 4 hours at 120° C. before cooling to room temperature. The reaction mixture is then filtered through fast-rate filter paper, and the solution is rotary-evaporated (85° C., 100 mbar) to remove DMF. The residue is re-dissolved in ethyl acetate (25 mL) and extracted sequentially by water (10 mL), 5% hydrochloric acid (10 mL), and saturated sodium chloride solution (10 mL). The resulting organic solution is dried over magnesium sulfate, filtered through fast-rate filter paper, and rotary-evaporated (85° C., 100 mbar) to yield a white solid (2.95 g). $^1$H NMR (400 MHz, DMSO-d$_6$) δ 5.83 (m, 4H), 5.15 (m, 8H), 4.34 (d, 8H), 3.73 (t, 4H), 1.53 (t, 4H), 1.25 (m, 12H). ESI-MS (m/z, MH$^+$) Calculated: 557.66 Da; Found: 557.22 Da.

5,5'-(1,4-phenylenebis(methylene))bis(1,3-diallyl-1,3,5-triazinane-2,4,6-trione) ("PEB") has the following structure:

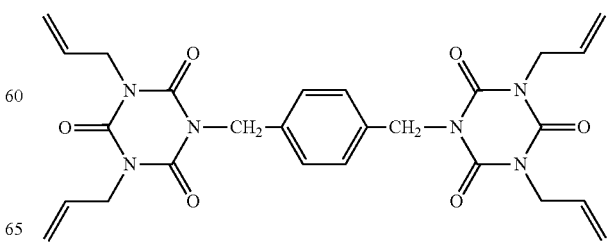

PEB is prepared by first dissolving 3 g (0.0143 mol) of unmodified diallyl isocyanurate in 15 mL of DMF. Next, add 1.98 g (0.0143 mol) of potassium carbonate into the solution, then heat the solution by a temperature-controlled oil bath to 50° C. Thereafter, 1.25 g (0.0072 mol) of 1,4-bis (chloromethyl)benzene is added as a toluene solution (10 mL) over ten minutes followed by heating the oil bath to 120° C. Then, the mixture is magnetically stirred for 4 hours in this 120° C. oil bath before cooling to room temperature. The reaction mixture is then filtered through fast-rate filter paper, and the solution is rotary-evaporated (85° C., 100 mbar) to remove solvents. The residue is re-dissolved in toluene (25 mL) and extracted sequentially by water (10 mL), 5% hydrochloric acid (10 mL), and saturated sodium chloride solution (10 mL). The resulting organic solution is dried over magnesium sulfate, filtered through fast-rate filter paper, and rotary-evaporated (85° C., 100 mbar) to yield a white solid (3.14 g). $^1$H NMR (400 MHz, DMSO-$d_6$) δ 7.43 (s, 4H), 5.89 (m, 4H), 5.30 (m, 8H), 5.05 (s, 4H), 4.49 (d, 8H). ESI-MS (m/z, MH$^+$) Calculated: 521.54 Da; Found: 521.21 Da.

Sample Compounding

All samples used in the following Examples are compounded according to the following procedure. First, feed polyethylene pellets and stabilizer preblend, if present, into a Haake mixer at 120° C. Allow the polyethylene to melt completely at a rotor speed of 30 rpm. Next, add the coagent and melt mix at 30 rpm for 1 minute. Then the dicumyl peroxide ("DCP") is added to the melt over half a minute and then mixed at 35 rpm for 3 minutes. Thereafter, the rotation is stopped, and the composition is removed from the Haake mixer and promptly hot pressed to a 1 mm-thick sheet at 120° C.

Example 1—Diallyl Isocyanurate as Compensation for Decreased DCP Loading

Prepare three Samples (S1-S3) using 1,3-diallyl-5-octyl isocyanurate ("DAIC-C8") as the crosslinking coagent according to the formulations provided in Table 1, below, and using the sample preparation methods described above.

TABLE 1

Compositions of S1-S3

| Component | S1 | S2 | S3 |
|---|---|---|---|
| LDPE 1 (g) | 97.91 | 96.65 | 96.17 |
| DAIC-C8 (g) | 1.10 | 2.51 | 3.09 |
| DCP (g) | 0.75 | 0.6 | 0.5 |
| Stabilizer Preblend (g) | 0.24 | 0.24 | 0.24 |
| Total: | 100.00 | 100.00 | 100.00 |
| Allyl-to-Active Oxygen ratio (molar) | 1.2 | 3.5 | 5.2 |
| Coagent-to-DCP ratio (weight) | 1.5 | 4.2 | 6.2 |

Analyze S1-S3 for curing behavior using the above-described Test Methods. The results are provided in Table 2, below.

TABLE 2

Properties of S1-S3

| Property | S1 | S2 | S3 |
|---|---|---|---|
| ML (dN · m) | 0.18 | 0.18 | 0.16 |
| MH (dN · m) | 3.28 | 3.62 | 3.56 |
| MH – ML (dN · m) | 3.10 | 3.44 | 3.40 |
| ts1@180° C. (min.) | 1.48 | 1.53 | 1.62 |
| T90@180° C. (min.) | 4.89 | 5.03 | 5.25 |
| ts1@140° C. (min.) | 63.35 | 74.67 | 61.35 |
| ts0.5@140° C. (min.) | 40.47 | 49.06 | 37.41 |

The results from Table 2 show that decreasing the amount of DCP (from S1 to S3) can be compensated by corresponding increases in diallyl isocyanurate crosslinking coagent, which is apparent by the comparable MH-ML values for all three of Samples S1-S3.

Example 2—Scorch Performance with Alkyl-Substituted Diallyl Isocyanurate Coagents Prepare two Comparative Samples (CS1 and CS2) and two Samples (S4 and S5) according to the formulations provided in Table 3, below, and using the sample preparation methods described above. Sample S4 is prepared using DAIC-C8 as the crosslinking coagent, and Sample S5 is prepared using 1,3-diallyl-5-tetradecyl isocyanurate ("DAIC-C14"). Comparative Sample CS1 is prepared with triallyl isocyanurate ("TAIC") as a crosslinking coagent, and Comparative Sample CS2 is prepared with 1,3-diallyl-5-octadecyl isocyanurate ("DAIC-C18").

TABLE 3

Compositions of CS1, CS2, S4, and S5

| Component | CS1 | CS2 | S4 | S5 |
|---|---|---|---|---|
| LDPE 1 (g) | 97.86 | 95.55 | 96.65 | 95.99 |
| TAIC (g) | 1.3 | — | — | — |
| DAIC-C8 (g) | — | — | 2.51 | — |
| DAIC-C14 (g) | — | — | — | 3.17 |
| DAIC-C18 (g) | — | 3.61 | — | — |
| DCP (g) | 0.6 | 0.6 | 0.6 | 0.6 |
| Stabilizer Preblend (g) | 0.24 | 0.24 | 0.24 | 0.24 |
| Total: | 100.00 | 100.00 | 100.00 | 100.00 |
| Allyl-to-Active Oxygen ratio (molar) | 3.5 | 3.5 | 3.5 | 3.5 |
| Coagent-to-DCP ratio (weight) | 2.2 | 6.0 | 4.2 | 5.3 |

Analyze CS1, CS2, S4, and S5 for curing behavior and scorch improvement using the above-described Test Methods. The results are provided in Table 4, below.

TABLE 4

Properties of CS1, CS2, S4, and S5

| Property | CS1 | CS2 | S4 | S5 |
|---|---|---|---|---|
| ML (dN · m) | 0.18 | 0.15 | 0.18 | 0.16 |
| MH (dN · m) | 3.83 | 3.82 | 3.62 | 3.57 |
| MH – ML (dN · m) | 3.65 | 3.67 | 3.44 | 3.41 |
| ts1@180° C. (min.) | 1.26 | 1.39 | 1.53 | 1.52 |
| T90@180° C. (min.) | 4.37 | 5.03 | 5.03 | 5.05 |
| ts1@140° C. (min.) | 62.54 | 56.26 | 74.67 | 57.43 |
| ts0.5@140° C. (min.) | 40.46 | 36.75 | 49.06 | 35.94 |
| Scorch Improvement (min.) | 24.50 | 18.47 | 33.83 | 16.16 |

As seen in Table 4, all samples exhibit similar scorch improvements, with the best scorch improvement being achieved with DAIC-C8 as the crosslinking coagent. It is noted that, although CS2 achieves sufficient scorch improvement, this sample exhibits poor resistance to coagent migration, as shown in Example 5, below.

Example 3—Scorch Performance with Alkenyl-Substituted Diallyl Isocyanurate Coagent Prepare a Sample (S6) using 1,3-diallyl-5-decenyl isocyanurate ("DAIC-decenyl") as the crosslinking coagent according to the formulation provided in Table 5, below, and using the sample preparation methods described above. For comparison, CS1 is reproduced below.

TABLE 5

Composition of CS1 and S6

| Component | CS1 | S6 |
|---|---|---|
| LDPE 1 (g) | 97.86 | 96.44 |
| TAIC (g) | 1.3 | — |
| DAIC-decenyl (g) | — | 2.72 |
| DCP (g) | 0.6 | 0.6 |
| Stabilizer Preblend (g) | 0.24 | 0.24 |
| Total: | 100.00 | 100.00 |
| Allyl-to-Active Oxygen ratio (molar) | 3.5 | 5.3 |
| Coagent-to-DCP ratio (weight) | 2.2 | 4.5 |

Analyze S6 for curing behavior and scorch improvement using the above-described Test Methods. The results are provided in Table 6, below. The analysis of CS1 has been reproduced below for comparison.

TABLE 6

Properties of CS1 and S6

| Property | CS1 | S6 |
|---|---|---|
| ML (dN · m) | 0.18 | 0.17 |
| MH (dN · m) | 3.83 | 3.86 |
| MH − ML (dN · m) | 3.65 | 3.69 |
| ts1@180° C. (min.) | 1.26 | 1.55 |
| T90@180° C. (min.) | 4.37 | 5.64 |
| ts1@140° C. (min.) | 62.54 | 78 |
| ts0.5@140° C. (min.) | 40.46 | 50 |
| Scorch Improvement (min.) | 24.50 | 40.47 |

The results shown in Table 6 indicate a greatly enhanced scorch improvement using DAIC-decenyl when compared to the use of TAIC as a crosslinking coagent.

Example 4—Scorch Performance with Bis(Diallyl Isocyanurate) Coagent

Prepare a Comparative Sample (CS3) and a Sample (S7) according to the formulations provided in Table 7, below, and using the sample preparation methods described above. CS3 is prepared using TAIC as the crosslinking coagent, while S7 is prepared using 5,5'-(Decane-1,10-diyl)bis(1,3-diallyl-1,3,5-triazinane-2,4,6-trione) ("di-DAIC-decyl") as the crosslinking coagent.

TABLE 7

Composition of CS3 and S7

| Component | CS3 | S7 |
|---|---|---|
| LDPE 2 (g) | 98.3 | 97.25 |
| DCP (g) | 0.85 | 0.85 |
| TAIC (g) | 0.85 | — |
| di-DAIC-decyl (g) | — | 1.9 |
| Total: | 100.00 | 100.00 |
| Allyl-to-Active Oxygen ratio (molar) | 1.6 | 2.2 |
| Coagent-to-DCP ratio (weight) | 1.0 | 2.2 |

Analyze CS3 and S7 for curing behavior and scorch improvement using the above-described Test Methods. The results are provided in Table 8, below.

TABLE 8

Properties of CS3 and S7

| Property | CS3 | S7 |
|---|---|---|
| ML (dN · m) | 0.18 | 0.18 |
| MH (dN · m) | 4.00 | 3.68 |
| MH − ML (dN · m) | 3.82 | 3.50 |
| ts1@180° C. (min.) | 1.13 | 1.21 |
| T90@180° C. (min.) | 4.08 | 4.42 |
| ts1@140° C. (min.) | 46.65 | 56.12 |
| ts0.5@140° C. (min.) | 28.72 | 32.94 |
| Scorch Improvement (min.) | 10.66 | 16.11 |

The results shown in Table 8 indicate enhanced scorch improvement when using di-DAIC-decyl over the use of TAIC as a crosslinking coagent.

Example 5—Coagent Migration

Prepare four Comparative Samples (CS4-CS7) and three Samples (S8-S10) according to the formulations provided in Table 9, below, and using the sample preparation methods described above. Sample S8 is prepared using 1,3-diallyl-5-butyl isocyanurate ("DAIC-C4") as the crosslinking coagent, Sample S9 is prepared using DAIC-C8 as the crosslinking coagent, and Sample S10 is prepared using DAIC-C14 as the crosslinking coagent. Comparative Sample CS4 is prepared with triallyl isocyanurate ("TAIC") as the crosslinking coagent, Comparative Sample CS5 is prepared with 1,3-diallyl-5-hexadecyl isocyanurate ("DAIC-C16") as the crosslinking coagent, Comparative Sample CS6 is prepared with DAIC-C18 as the crosslinking coagent, and Comparative Sample CS7 is prepared with 1,3-diallyl-5-docosyl isocyanurate ("DAIC-C22") as the crosslinking coagent.

TABLE 9

Compositions of CS4-CS7 and S8-S10

| Component | CS4 | S8 | S9 | S10 | CS5 | CS6 | CS7 |
|---|---|---|---|---|---|---|---|
| LDPE1 (g) | 98.16 | 98.11 | 97.91 | 97.63 | 97.53 | 97.44 | 97.24 |
| Stabilizer Preblend (g) | 0.24 | 0.24 | 0.24 | 0.24 | 0.24 | 0.24 | 0.24 |
| TAIC (g) | 0.85 | — | — | — | — | — | — |
| DAIC-C4 (g) | — | 0.9 | — | — | — | — | — |
| DAIC-C8 (g) | — | — | 1.1 | — | — | — | — |
| DAIC-C14 (g) | — | — | — | 1.38 | — | — | — |
| DAIC-C16 (g) | — | — | — | — | 1.48 | — | — |
| DAIC-C18 (g) | — | — | — | — | — | 1.57 | — |
| DAIC-C22 (g) | — | — | — | — | — | — | 1.77 |
| DCP (g) | 0.75 | 0.75 | 0.75 | 0.75 | 0.75 | 0.75 | 0.75 |
| Total: | 100.00 | 100.00 | 100.00 | 100.00 | 100.00 | 100.00 | 100.00 |
| Allyl-to-Active Oxygen ratio (molar) | 1.8 | 1.2 | 1.2 | 1.2 | 1.2 | 1.2 | 1.2 |
| Coagent-to-DCP ratio (weight) | 1.1 | 1.2 | 1.5 | 1.8 | 2.0 | 2.1 | 2.4 |

Analyze CS4-CS7 and S8-S10 for coagent migration according to the procedure described in the Test Methods section, above. Results are provided in Table 10, below.

TABLE 10

Coagent Migration of CS4-CS7 and S8-S10

| Condition | CS4 | S8 | S9 | S10 | CS5 | CS6 | CS7 |
|---|---|---|---|---|---|---|---|
| 23° C., 4 weeks (ppm) | 1,394 | 135 | 161 | 172 | 3,531 | 4,249 | NM* |
| 60° C., 4 weeks (ppm) | 182 | 168 | 187 | 146 | 164 | 170 | NM* |

*Not measured due to apparent high migration by visual determination

As can be seen from the results provided in Table 10, the comparative samples using TAIC, DAIC-C16, DAIC-C18, and DAIC-C22 had extraordinarily high coagent migration when stored at room temperature for 4 weeks as compared to those samples prepared with either DAIC-C4, DAIC-C8, or DAIC-C14.

Example 5—Coagent Migration with 5,5'-(1,4-phenylenebis(methylene))bis(1,3-diallyl-1,3,5-triazinane-2,4,6-trione) Coagent Prepare a Comparative Sample (CS8) and a Sample (S11) according to the formulations provided in Table 11, below, and using the sample preparation methods described above. Sample S11 is prepared using 5,5'-(1,4-phenylenebis(methylene))bis(1,3-diallyl-1,3,5-triazinane-2,4,6-trione) ("PEB") as the crosslinking coagent. Comparative Sample CS8 is prepared with TAIC as the crosslinking coagent.

TABLE 11

Compositions of CS8 and S11

| Component | CS8 | S11 |
|---|---|---|
| LDPE1 (g) | 97.86 | 96.45 |
| Stabilizer Preblend (g) | 0.24 | 0.24 |
| TAIC (g) | 1.3 | — |
| PEB (g) | — | 2.71 |
| DCP (g) | 0.6 | 0.6 |
| Total: | 100.00 | 100.00 |
| Allyl-to-Active Oxygen ratio (molar) | 3.5 | 4.7 |
| Coagent-to-DCP ratio (weight) | 2.2 | 4.5 |

Analyze CS8 and S11 for coagent migration according to the procedure described in the Test Methods section, above. Results are provided in Table 12, below.

TABLE 12

Coagent Migration of CS8 and S11

| Condition | CS8 | S11 |
|---|---|---|
| 23° C., 4 weeks (ppm) | 2,199 | 210 |
| 60° C., 4 weeks (ppm) | 1,240 | 840 |

As seen in Table 12, the PEB coagent provides superior coagent migration as compared to TAIC as a crosslinking coagent.

The invention claimed is:
1. A crosslinkable polymeric composition, consisting of:
 (a) an ethylene-based polymer;
 (b) an organic peroxide; and
 (c) a diallyl isocyanurate crosslinking coagent having a structure of formula (I):

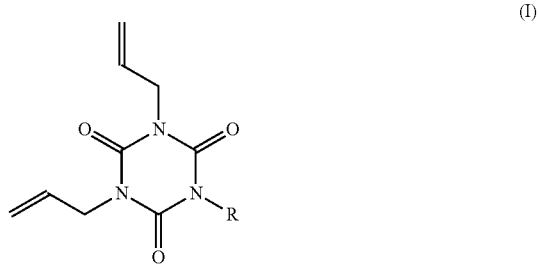

wherein R of formula (I) is an alkyl having from 4 to 10 carbon atoms or an alkenyl having 10 carbon atoms; and
optionally, one or more additives selected from antioxidants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators or an alkenyl having 10 carbon atoms.
2. The crosslinkable polymeric composition of claim 1, wherein said diallyl isocyanurate crosslinking coagent and said organic peroxide are present in a coagent-to-peroxide weight ratio of greater than 1:1.

3. The crosslinkable polymeric composition of claim 1, wherein said ethylene-based polymer comprises a high-pressure low-density polyethylene; wherein said organic peroxide comprises dicumyl peroxide; wherein the additive is present and is an antioxidant.

4. The crosslinkable polymeric composition of claim 1, wherein said ethylene-based polymer is present in an amount ranging from 50 to 99 weight percent, based on the entire crosslinkable polymeric composition weight; wherein said organic peroxide is present in an amount of less than 1.0 weight percent, based on the entire crosslinkable polymeric composition weight; wherein said diallyl isocyanurate crosslinking coagent is present in an amount ranging from 0.1 to 3 weight percent, based on the entire crosslinkable polymeric composition weight.

5. The crosslinkable polymeric composition according to claim 1, wherein when said crosslinkable polymeric composition undergoes crosslinking, said crosslinkable polymeric composition has a scorch improvement of at least 15 minutes when compared to a comparative crosslinkable polymeric composition except that the comparative crosslinkable polymeric composition contains no crosslinking coagent, which has been replaced with an equivalent amount of additional ethylene-based polymer.

6. The crosslinkable polymeric composition according to claim 1, wherein said crosslinkable polymeric composition exhibits a crosslinking coagent migration to the surface of said crosslinkable polymeric composition of less than 1,000 parts per million, based on the total weight of said crosslinkable polymeric composition, when stored for four weeks at 23° C. and 1 atm.

7. A crosslinked polymeric article prepared from the crosslinkable polymeric composition according to claim 1.

8. A coated conductor, comprising:
   a conductive core; and
   a polymeric layer at least partially surrounding said conductive core, wherein at least a portion of said polymeric layer comprises said crosslinked article of claim 7.

* * * * *